(12) United States Patent
Shteinhauz et al.

(10) Patent No.: US 6,257,956 B1
(45) Date of Patent: Jul. 10, 2001

(54) METHOD TO IDENTIFY AND REMOVE MACHINE CONTRIBUTIONS FROM TIRE UNIFORMITY MEASUREMENTS

(75) Inventors: Gregory David Shteinhauz, Akron; Yiu Wah Luk, Hudson, both of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/518,898

(22) Filed: Mar. 6, 2000

(51) Int. Cl.[7] .................................................. B24B 49/00
(52) U.S. Cl. .................... 451/8; 451/10; 451/11; 451/49; 451/254; 451/258
(58) Field of Search .................... 451/8, 10, 11, 451/49, 54, 254, 258

(56) References Cited

U.S. PATENT DOCUMENTS

| | | |
|---|---|---|
| 2,962,737 | 12/1960 | Soderquist . |
| 3,039,839 | 6/1962 | Waters et al. . |
| 3,389,193 | 6/1968 | Hughes . |
| 3,635,610 | 1/1972 | Hall et al. . |
| 3,739,533 | 6/1973 | Iida et al. . |
| 3,838,142 | 9/1974 | Hochstein . |
| 3,848,368 | 11/1974 | Toshioka et al. . |
| 3,865,527 | 2/1975 | McGhee et al. . |
| 3,872,208 | 3/1975 | Brown et al. . |
| 3,880,556 | 4/1975 | Brown et al. . |
| 3,946,527 | 3/1976 | Beer . |
| 4,078,339 | 3/1978 | Ongaro . |
| 4,095,374 | 6/1978 | Ugo . |
| 4,171,641 | 10/1979 | Landsness . |
| 4,173,850 | 11/1979 | Gormish et al. . |
| 4,338,818 | 7/1982 | Hill et al. . |
| 4,404,848 | 9/1983 | Iwama et al. . |
| 4,404,849 | 9/1983 | Iwama et al. . |
| 4,420,453 | 12/1983 | Ayers . |
| 4,458,451 | 7/1984 | Rogers et al. . |
| 4,458,526 | 7/1984 | Doi et al. . |
| 4,654,253 | 3/1987 | Brown et al. . |
| 4,736,546 | 4/1988 | Ugo . |
| 4,914,869 | 4/1990 | Bayonnet et al. . |
| 5,060,510 | 10/1991 | Rousseau . |
| 5,103,669 | 4/1992 | Kato . |
| 5,263,284 | 11/1993 | Wild . |
| 5,309,377 | 5/1994 | Beebe . |
| 5,365,781 | 11/1994 | Rhyne . |
| 5,396,438 | 3/1995 | Oblizajek . |
| 5,458,176 | 10/1995 | Rhyne . |
| 5,614,676 | 3/1997 | Dutt et al. . |
| 5,616,859 | 4/1997 | Rhyne . |
| 5,639,962 | 6/1997 | Maloney . |
| 6,139,401 | * 10/2000 | Dunn et al. ............................ 451/10 |

* cited by examiner

Primary Examiner—Timothy V. Eley
(74) Attorney, Agent, or Firm—Howard M Cohn (57) ABSTRACT

Method to identify and remove machine contributions from tire uniformity measurements made on a tire uniformity machine by averaging one or more measurements of tire uniformity from a single test tire to calculate an average machine contribution signal, and then subtracting the average machine contribution signal from a tire uniformity measurement signal for a production tire to provide a corrected tire uniformity measurement for the production tire.

11 Claims, 4 Drawing Sheets

METHOD TO IDENTIFY AND REMOVE MACHINE CONTRIBUTIONS FROM TIRE UNIFORMITY MEASUREMENTS

TECHNICAL FIELD

The present invention generally relates to the measurement of tire uniformity with a tire uniformity machine, and more specifically to the removal of the erroneous contributions of the tire uniformity machine to the tire uniformity measurement signals.

BACKGROUND OF THE INVENTION

In the art of manufacturing pneumatic tires, rubber flow in the tire mold or minor differences in the dimensions of the belts, beads, liners, treads, plies of rubberized cords, etc., sometimes cause non-uniformities in the final tire. Non-uniformities of sufficient amplitude will cause force variations on a surface, such as a road, against which the tires roll producing vibration and noise. When such variations exceed an acceptable maximum level, the ride and handling of a vehicle utilizing such tires will be adversely affected.

Tire uniformity machines are used to monitor the quality of the tire production process and may guide or incorporate corrective measures such as the grinding to improve the balance and uniformity of a tire. In general, a tire uniformity machine subjects a tire to normal conditions of mounting, pressurization, rotation and load while collecting measurement data on variations of deflection, force and velocity. A tire uniformity machine typically includes an assembly for rotating a tire against the surface of a rotating loading wheel. In this testing arrangement, the loading wheel is moved in a manner dependent on the forces exerted by the rotating tire and those forces are measured by appropriately placed measuring devices. When a tire being tested yields less than acceptable results, shoulder and/or center rib grinders are used to remove a small amount of the tire tread at precisely the location of the non-uniformities detected by the measuring devices. In a sophisticated tire uniformity machine, the measurements are stored and interpreted in digital form by a computer and rubber is removed from the tire tread using grinders controlled by the computer. Examples of machines utilizing these methods are disclosed in U.S. Pat. Nos. 3,739,533; 3,946,527; 4,914,869 and 5,263,284.

Unavoidably tire uniformity machines are not themselves perfectly uniform, and so tire uniformity measurement signals may include an erroneous contribution from the tire uniformity machine itself. In effect, minor variations in the design, construction and operation of a tire uniformity machine contribute to variations of deflection, force or velocity that contaminate the tire uniformity measurements with a machine contribution. In general, tire uniformity machines are designed, manufactured and operated to minimize the machine contribution to the tire uniformity measurement data. However there are technical and cost limitations to the precision and care with which a tire uniformity machine can be built and operated such that some machine contribution is inevitable. The prior art provides a variety of examples addressing methods to avoid and correct tire uniformity measurement errors.

As noted by U.S. Pat. No. 4,404,848 ('848), it is often the case that measured values contain errors due to rotational deflections of the rims that grip the inspected tire and/or the load wheel of the tire uniformity machine. In addition small deflections occur due to the deterioration of parts, by rust, or by bruises which are developed during use of the inspecting machines. A method to correct these types of errors is disclosed by the '848 patent wherein the radial runout of the load wheel is measured without a tire in place to obtain an erroneous deflection signal. The erroneous deflection signal is then multiplied by the spring constant of the measured tire and subtracted from the measured value of the radial force obtained from the tested tire.

U.S. Pat. No. 4,404,849 describes a method for correcting errors of measurement due to variations in tire pressure in a tire uniformity inspecting operation.

U.S. Pat. No. 5,614,676 ('676) describes a method of vibration analysis for tire uniformity machines by using signals from load cells when the machine idles. The signals are sent to a computer that outputs an alarm signal when the amplitude of vibration at selected frequencies exceeds acceptable levels.

Since complete elimination of defects and imperfections with the tire uniformity machine is difficult, it is more practical to accept a certain degree of deflections and vibrations while continuing to develop improved methods to monitor and accommodate the inevitable machine contributions.

SUMMARY OF THE INVENTION

The present invention relates to a method for correcting errors of measurement made on tire uniformity machines by identifying and removing machine contributions from tire uniformity measurements. Tire uniformity machines are configured to test a tire under normal conditions of mounting, inflation pressure, load and rotational speed while collecting measurements of radial, tangential and lateral displacements and forces. The present invention is a method which includes calculating the effect of the average machine contribution to the measured values of production tire uniformity as measured by a tire uniformity machine. The machine contribution signal is subtracted from the production tire measurement signals to provide a more accurate basis to evaluate the uniformity of a production tire and guide, as necessary, corrective measures.

The method of the invention primarily includes the steps of performing one or more tire uniformity measurements on a test tire, and storing the average test tire uniformity measurement data to use as an indicator of the average machine contribution to tire uniformity measurements. When a production tire is measured on the same tire uniformity machine, the stored machine contribution data/signal is subtracted from the production tire data/signal to produce a corrected production tire uniformity measurement.

In an aspect of the method of the invention, the determination of the average machine contribution signal can be enhanced by performing repeated measurements of uniformity on the same single test tire. For these repeated measurements, the single tire is removed and remounted in a randomly determined orientation on the tire uniformity machine before each repeated measurement, and each repeated measurement is included in an average of all the measurements of the single test tire on the tire uniformity machine. This average becomes the average machine contribution signal to be stored for use in correcting production tire measurements.

In a first embodiment of the method of the invention, the repeated measurements are individually stored and then all averaged together upon completion of the final repeated measurement. In an alternate embodiment of the method of the invention, this process is somewhat simplified by gradually refining the average machine contribution signal by averaging each repeated measurement with the previously determined average before performing the next repeated measurement.

In an aspect of the method of the invention, the number of repeated measurements may be determined by calculations based on a statistical analysis which quantifies the random variability of the machine contribution.

In an aspect of the method of the invention, the corrected production tire uniformity signal is used to evaluate quality/uniformity of the production tire and to guide corrective procedures, such as but not exclusive to, grinding that may be used to improve quality and uniformity of the production tire.

In an aspect of the method of the invention, the method is implemented on a digital computer where measurement signals are digitized and stored, calculations are performed, and corrective control actions are processed in digitized forms in an arithmetic operation circuit.

In an aspect of the method of the invention, additional production tires are measured and their tire uniformity signals are corrected utilizing the stored average machine contribution signal.

BRIEF DESCRIPTION OF THE DRAWINGS

The structure, operation, and advantages of the illustrated embodiment of the invention will become further apparent upon consideration of the following description taken in conjunction with the accompanying drawings, wherein.

DEFINITIONS

"Axial" and "Axially" means the lines or directions that are parallel to the axis of rotation of the tire.

"Axially Inward" means in an axial direction toward the equatorial plane.

"Axially Outward" means in an axial direction away from the equatorial plane.

"Bead" or "Bead Core" generally means that part of the tire comprising an annular tensile member of radially inner beads that are associated with holding the tire to the rim.

"Belt Structure" or "Reinforcement Belts" or "Belt Package" means at least two annular layers or plies of parallel cords, woven or unwoven, underlying the tread, unanchored to the bead, and having both left and right cord angles in the range from 18 degrees to 30 degrees relative to the equatorial plane of the tire.

"Carcass" means the tire structure apart from the belt structure and tread, but including the beads.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cyclical data" means data having repeating characteristics with a regular periodic frequency or time interval.

"Equatorial Plane" means the plane perpendicular to the tire's axis of rotation and passing through the center of its tread; or the plane containing the circumferential centerline of the tread.

"Footprint" means the contact patch or area of contact of the tire tread with a flat surface under normal load pressure and speed conditions.

"Lateral" means a direction going from one sidewall of the tire towards the other sidewall of the tire, generally across the tread perpendicular to the tire circumference.

"Ply" means a cord-reinforced layer of rubber coated radially deployed or otherwise parallel cords.

"Radial" and "radially" mean directions radially toward or away from the axis of rotation of the tire.

"Radial Ply Tire" means a belted or circumferentially-restricted pneumatic tire in which at least one ply has cords which extend from bead to bead and are laid at cord angles between 65 degrees and 90 degrees with respect to the equatorial plane of the tire.

"Shoulder" means the upper portion of sidewall just below the tread edge.

"Sidewall" means that portion of a tire between the tread and the bead.

"Tangential" and "Tangentially" refer to segments of circular curves that intersect at a point through which can be drawn a single line that is mutually tangential to both circular segments.

"Tread" means the ground contacting portion of a tire.

DETAILED DESCRIPTION OF THE INVENTION

Figure 1:
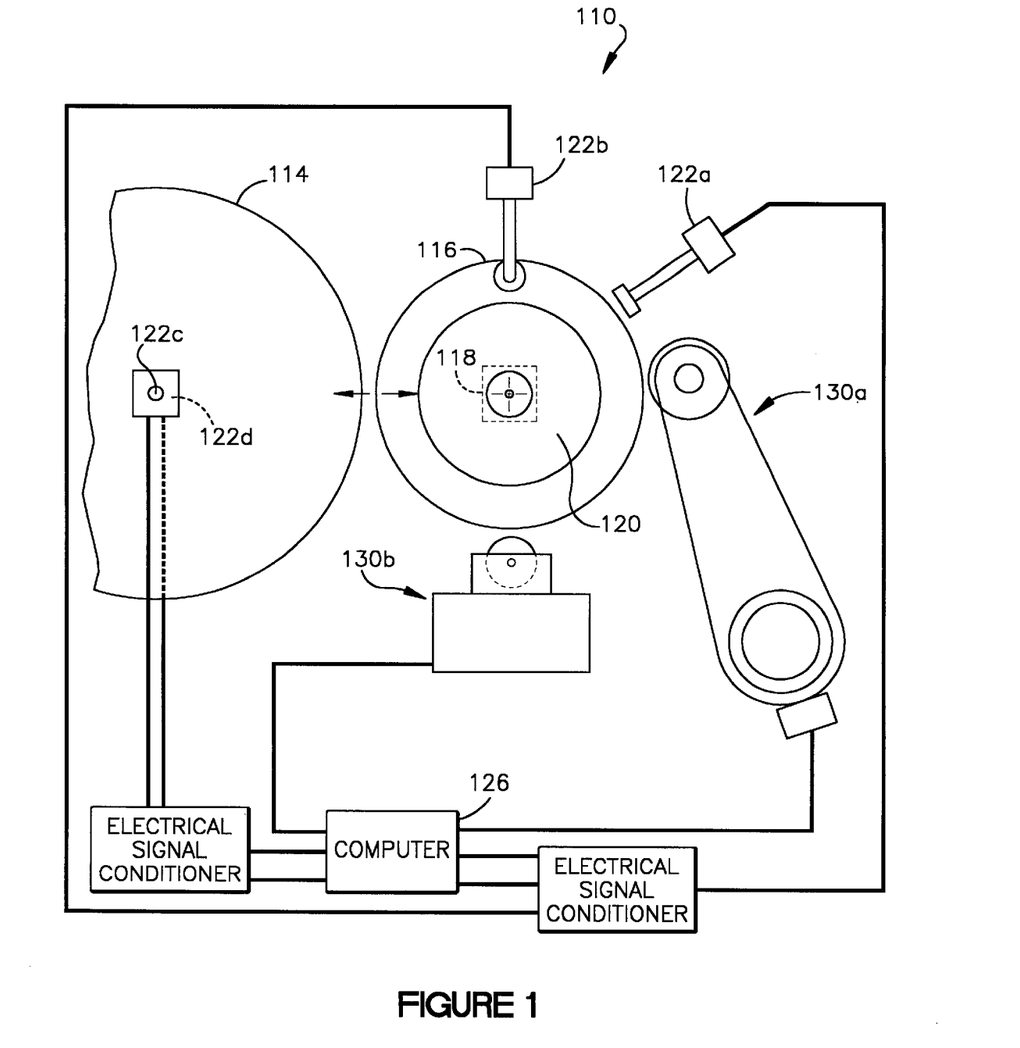
FIG. 1 is a representative view of a tire uniformity machine with a tire mounted thereon in accordance with the present invention.

Referring now to the drawings, which are for purposes of illustrating embodiments of the invention only, and not for purposes of limiting the invention, FIG. 1 shows a schematic of a tire uniformity machine (TUM) 110 used to measure the lateral and radial forces generated by tire non-uniformity. A load wheel 114 applies a load to a tire 116 mounted on a drive wheel 120 that is rotated by a drive motor 118. One or more sensors 122 (122a, 122b, 122c, 122d) measure the lateral, tangential, and radial forces exerted by the tire 116. Lateral forces occur perpendicular to the plane in which the tire 116 rotates. Tangential forces act tangentially to the tire's circumference. Radial forces act parallel to a radius of the tire 116. The measurements are made electronically by the tire uniformity machine 110 and then converted to force measurements. Uniformity force measurement signals are then preferably transferred to a computer 126 for analysis and possible storage. The tire uniformity measurements are an indicator of tire quality related to uniformity, and can be used to accept or reject the measured tire based on predetermined quality criteria. Optional grinders 130 (130a, 130b) can be incorporated in the tire uniformity machine 110 in order to correct the tire 116 uniformity, thereby improving its quality, by grinding as determined by the computer 126 which utilizes the uniformity force measurements.

The method of this invention is described in a preferred embodiment which utilizes an un-specified one of various ones of the tire uniformity machine 110 uniformity force measurements. The description herein refers to a generalized uniformity force measurement without reference to a specific physical measurement of uniformity because the method of this invention is considered to be applicable to all the usual measurements of uniformity including, but not limited to: radial force and/or displacement, lateral force and/or displacement, conicity, and tangential forces. A complete application of the method of this invention is intended to include one or more of these usual measurements of uniformity, with the measurements being conducted essentially simultaneously using multiple sensors 122, resulting in multiple sets of measurement data, one set per measurement type. As is known, each tire uniformity machine 110 measurement data set is produced by a sensor 122 which outputs a time-related series of readings. The first reading in a series is assumed to be at a time "0" (zero) which the tire uniformity machine 110 causes to occur at a fixed angular location of the drive wheel 120 which is holding the tire 116 being measured. The complete set of readings from the measurement time of a tire constitute a measurement data set, which is also called a measurement signal, especially when the measurement data points are plotted versus time. Therefore, in the description herein, the terms "signal", "data", and "data set" will be used interchangeably to refer to a set of tire uniformity measurements (a measurement of tire uniformity).

Figure 2:
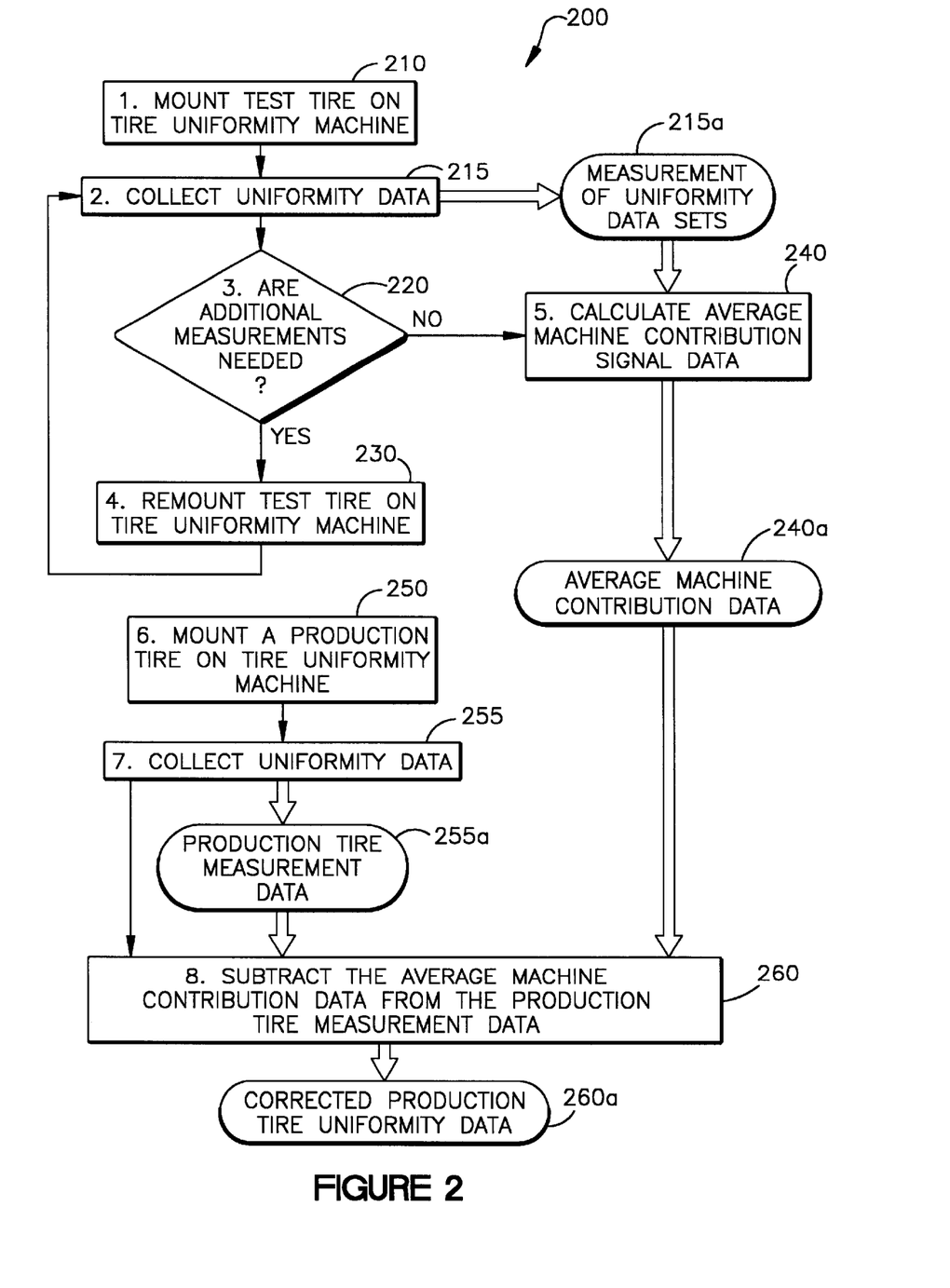
FIG. 2 is a flow diagram illustrating a procedural implementation of a preferred embodiment of the present invention.

The flow chart of FIG. 2 illustrates the steps in a preferred method 200 of the present invention. In step one 210, a test tire 116 is mounted in a tire uniformity machine 110. The test tire 116 is approximately the same overall design as the production tires which will be tested on the tire uniformity machine 110 in order to approximate the same test conditions, thereby producing similar machine contribution effects for the test tire 116 compared to when the production tires are tested. Preferably the test tire 116 has reasonably good tire uniformity. Excessive non-uniformities in the test tire 116 may be difficult to average out of the measurement of machine contribution.

In step two 215, the tire uniformity machine 110 is operated in the usual manner to collect a set of uniformity data 215a for the test tire 116. Tire uniformity data (e.g., 215a) for a tire 116 is collected as data, typically stored in a computer 126, which represents a set of measurements by a sensor 122 over a period of time sufficient to include multiple rotations of the tire 116. The uniformity of the tire 116 is indicated by the variation of the sensor measurements collected over the period of time. Such a set of time-dependent measurements (data) may also be referred to as a single measurement signal or as a single measurement of tire uniformity. An example of a measurement signal 215a from a test tire 116 is illustrated by the curve 316a in FIG. 3A. The measurement of uniformity data 215a (data set) is stored in digital form for further analysis.

Figure 3A:
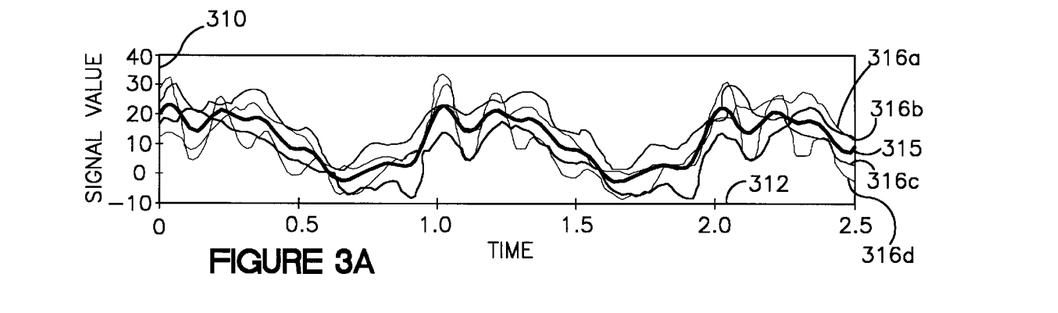
FIG. 3A illustrates an average machine contribution signal as an average of multiple measurement signals for a test tire.
Figure 3B:
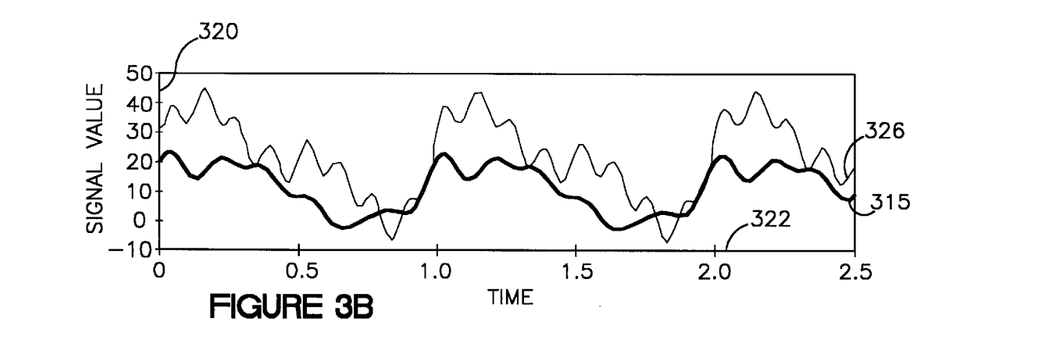
FIG. 3B illustrates the average machine contribution signal plotted with a measured production tire uniformity signal.
Figure 3C:
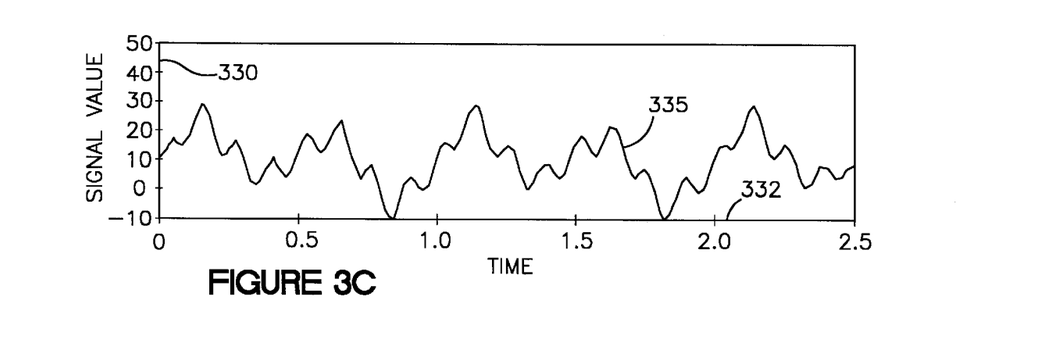
FIG. 3C illustrates a corrected uniformity signal for the tested production tire resulting from the subtraction of the average machine contribution signal from the measured production tire uniformity signal.

Uniformity measurement signals are illustrated in FIGS. 3A, 3B, and 3C. In each drawing, a measurement signal value (e.g., radial force) is plotted on the vertical axis 310, 320, 330 versus "time" on the horizontal axis 312, 322, 332. The time scale could be, for example, seconds, but is shown herein as it is commonly recorded in revolutions of the drive wheel 120. Revolutions of the drive wheel 120 are conceptually equivalent to clock time, and are directly proportional if the drive wheel 120 is revolving at a constant angular velocity.

Step three 220 is a decision step wherein it is determined whether additional (repeat) measurements of uniformity are required for the test tire 116. If the outcome of the decision is "yes", then in step four 230, the test tire 116 is dismounted and remounted on the same tire uniformity machine 110 and steps two 215 and three 220 are repeated: i.e., the remounted test tire 116 has a repeated measurement of uniformity data 215a collected 215 and then the decision step three 220 is repeated. The requirement of repeated measurements may be determined by a statistical procedure such as an analysis of the variance of the multiple measurement data sets 215a to quantify the random variability of the machine contribution. Alternatively, statistical procedures may be implemented to determine a number of repetitions sufficient to average out the non-uniformities of the test tire 116. Alternatively the number of repetitions may be specified as a fixed number to simplify the procedure for routine implementation on the factory floor. For example, previous statistical analysis may have shown that approximately 25 repeated measurements of a test tire 116 will generally provide sufficient data for the calculation of a representative, or average, machine contribution signal. It is possible that the procedure 200 would be limited to a single measurement of uniformity data 215a, if for example, a quick check of a previously checked TUM is desired. It is understood that such a quick check is not statistically reliable but may still be useful in certain circumstances.

Each time that step four 230 is repeated, the test tire 116 is removed and then remounted on the TUM drive wheel 120 in a randomly determined orientation with respect to the drive wheel 120. This causes any defects (non-uniformities) in the test tire 116 (preferably minor) to contribute signal values at randomly different times in each measurement of uniformity data set 215a. In contrast, the machine contribution to signal values should occur at the same time in each measurement of uniformity data set 215a because the time "0" is determined by a fixed angular reference point on the drive wheel 120. The combination of these effects, plus "noise" and other random effects on the measurements produce slightly different measurement signals each time the test tire 116 is measured. For example, four repeated tire uniformity measurement signals 316 (316a, 316b, 316c, 316d) are illustrated by the thin lines in FIG. 3A.

When the decision step three 220 has determined that no more additional measurements are needed, the process 200 proceeds to step five 240, wherein an average machine contribution signal is calculated by averaging all of the repeated measurement of uniformity data sets 215a (e.g., signals 316) from the single test tire 116. The process of averaging measurement signals 316 to calculate an average machine contribution signal 315 is illustrated by FIG. 3A wherein the calculated average machine contribution signal 315 is shown by a heavy line surrounded by several thin lines 316 (316a, 316b, 316c, 316d). Thus calculated, the average machine contribution signal 315 is stored as a set of average machine contribution data 240a, preferably in digital form, to be used for the correction of uniformity data from a number of production tires.

The method 200 steps for correcting uniformity data for a production tire begin with step six 250: the mounting of a production tire on the same tire uniformity machine used for steps 1 to 5 of the method 200 of this invention. In step seven 255, the tire uniformity machine is operated in a normal manner to collect uniformity data 255a for the production tire, and to store the production tire measurement data 255a in digital form. In step eight 260, illustrated by FIG. 3B, the average machine contribution signal 315 (data 240a) is subtracted from the production tire measurement signal 326, resulting in a corrected production tire uniformity measurement signal 335 illustrated in FIG. 3C. The data 260a for the corrected tire uniformity measurement signal 335 for the production tire can now be used to evaluate the quality (uniformity) of the production tire and to determine the need for, and if necessary, to guide corrective measures such as grinding that may be used to improve the quality/uniformity of the production tire. As a result of utilizing the method 200 of this invention, the corrected tire uniformity measurement data 260a more closely represents the actual uniformity of the production tire itself, without spurious data due to contributions from the characteristics of the tire uniformity machine 110 used to measure the production tire uniformity.

Figure 2A:
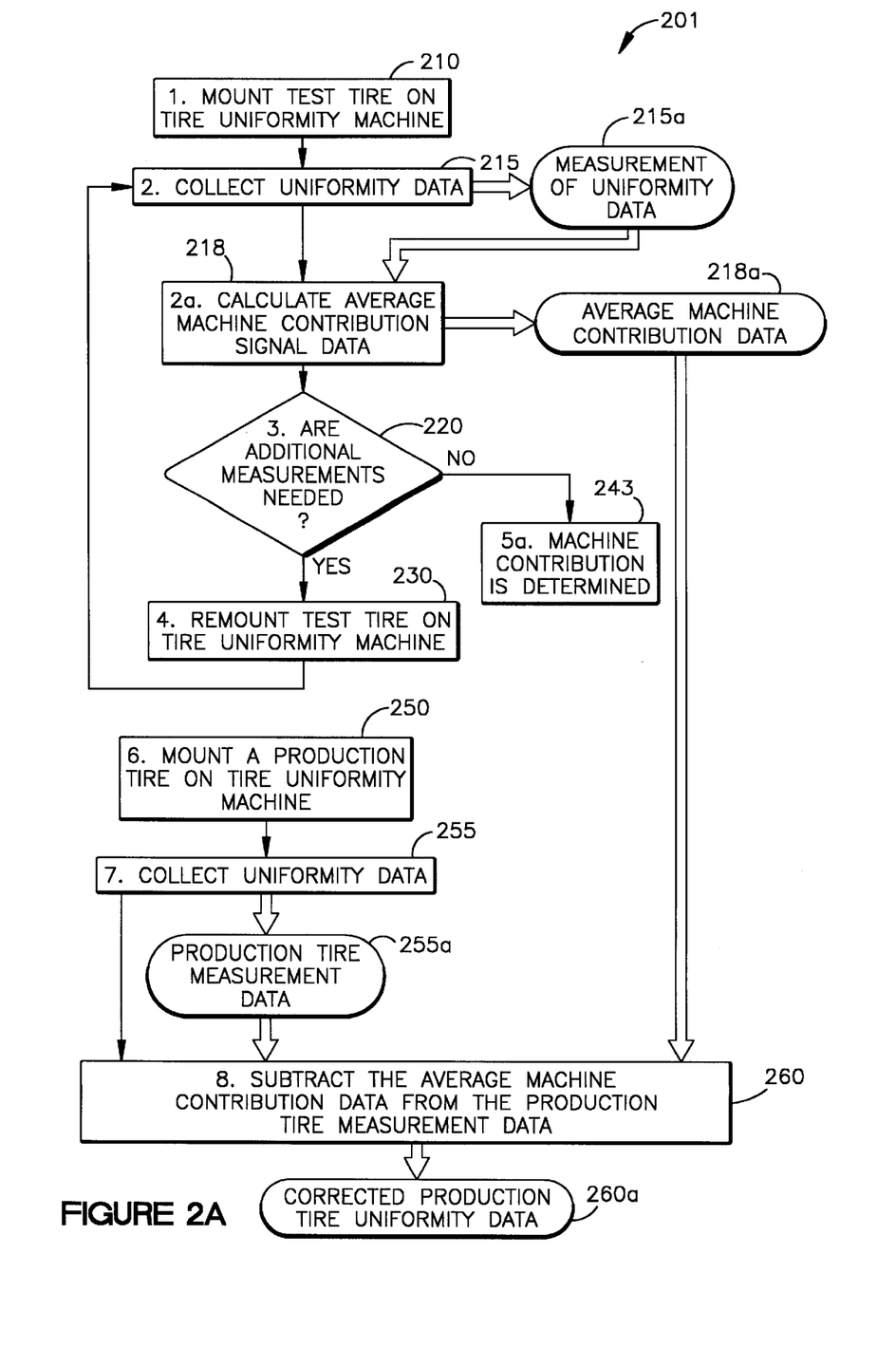
FIG. 2A is a flow diagram illustrating a procedural implementation of an alternate embodiment of the present invention.

To continue the method 200 of this invention for additional production tires, steps six 250 through eight 260 are performed for each additional production tire. It is understood that the uniformity of a significant number of production tires can be measured using only steps six 250 through eight 260 before it will be necessary to perform steps one 210 through five 240 in order to recalculate the average machine contribution data 240a by the steps of remounting, measuring and averaging repeated measurements of a test tire 116. It is assumed that well-known statistical methods will be employed to determine when it is necessary to so recalculate the average machine contribution data 240a. The flow chart of FIG. 2A illustrates the steps in an alternate embodiment which is a simplified method 201 of the present invention. This simplified method 201 may be employed when there is no need to save the individual uniformity measurement data sets (e.g., 316a. . . 316d) from repeated measurements 215a of the test tire 116. The method 201 results in less data storage requirements and potentially faster and/or simpler data handling and computation in computers 126 which may be of limited capabilities. Where the steps of the alternate embodiment 201 of the method are substantially the same as in the preferred embodiment 200 of the method, these same steps have the same reference numbers. In like manner, when the steps of the two method embodiments differ, the different steps have different reference numbers.

In step one 210 of the method 201 (substantially the same as step one 210 of the method 200), a test tire 116 is mounted in a tire uniformity machine 110. In step two 215, the tire uniformity machine 110 is operated in the usual manner to collect a set of uniformity data 215a for the test tire 116. An example of a measurement signal 215a from a test tire 116 is illustrated by the curve 316a in FIG. 3A. The measurement of uniformity data 215a is stored in digital form for further analysis.

In step 2a (218) an average machine contribution data set 218a is determined by averaging the measurement of uniformity data 215a in with the previously-determined average machine contribution data set 218a. For the first time step 2a (218) is implemented, a statistically-determined value (e.g., zero) will be used for the previously-determined average machine contribution data set 218a. Known statistical methods, such as logarithmically-weighted averaging, are used to incrementally obtain an average like this.

Step three 220 is a decision step wherein it is determined whether additional (repeat) measurements of uniformity are required for the test tire 116. If the outcome of the decision is "yes", then in step four 230, the test tire 116 is dismounted and remounted on the same tire uniformity machine and steps 2 (215), 2a (218), and 3 (220) are repeated: i.e., the remounted test tire 116 has a repeated measurement of uniformity data 215a collected 215, the repeated measurement data 215a is averaged 218 into the average machine contribution data 218a, and then the decision step three 220 is repeated. The requirement of repeated measurements is most likely pre-determined by a statistical procedure yielding a fixed number of repeated measurements to be performed.

Each time that step four 230 is repeated, the test tire 116 is removed and then remounted on the TUM drive wheel 120 in a randomly determined orientation with respect to the drive wheel 120. Four example repeated tire uniformity measurement signals 316 (316a, 316b, 316c, 316d) are illustrated by the thin lines in FIG. 3A. In the simplified method 201, the individual signals 316a. . . 316d would not be saved; rather, after each signal 316 is measured it would be averaged into the average signal 315, thus gradually refining the shape of the average machine contribution signal 315 for the average machine contribution data 218a.

When the decision step three 220 has determined that no more additional measurements are needed, the process 201 proceeds to step 5a (243) which indicates the completion of the determination of machine contribution phase of the simplified method 201, i.e., the average machine contribution data 218a is deemed ready to be used for correction of a number of production tire uniformity measurements.

The simplified method 201 steps for correcting uniformity data for a production tire are substantially the same as the corresponding steps in the method 200, and begin with step six 250: the mounting of a production tire on the same tire uniformity machine used for steps 1 to 5a of the simplified method 201 as detailed hereinabove. In step seven 255, the tire uniformity machine is operated in a normal manner to collect uniformity data 255a for the production tire, and to store the production tire measurement data 255a in digital form. In step eight 260, illustrated by FIG. 3B, the average machine contribution signal 315 (data 218a) is subtracted from the production tire measurement signal 326, resulting in a corrected production tire uniformity measurement signal 335 illustrated in FIG. 3C. The data 260a for the corrected tire uniformity measurement signal 335 for the production tire can now be used to evaluate the quality (uniformity) of the production tire and to determine the need for, and if necessary, to guide corrective measures, such as for example grinding, that may be used to improve the quality/uniformity of the production tire. As a result of utilizing the simplified method 201 of this invention, the corrected tire uniformity measurement data 260a more closely represents the actual uniformity of the production tire itself, without spurious data due to contributions from the characteristics of the tire uniformity machine 110 used to measure the production tire uniformity.

To continue the simplified method 201 of this invention for additional production tires, steps six 250 through eight 260 are performed for each additional production tire. It is understood that the uniformity of a significant number of production tires can be measured using only steps six 250 through eight 260 before it will be necessary to perform steps one 210 through 5a (243) in order to recalculate the average machine contribution data 218a by the steps of remounting, measuring and averaging repeated measurements of a test tire 116. It is assumed that well-known statistical methods will be employed to determine when it is necessary to so recalculate the average machine contribution data 218a.

It is anticipated that the steps of the methods 200 and 201 of this invention will be implemented using digital computer technology where the measurement signals are digitized and stored, calculations are performed and corrective control actions are processed in digitized forms in an arithmetic operation circuit such as the computer 126.

The invention has been described with reference to a preferred embodiment and an alternate embodiment. Modifications and alterations may occur to others upon a reading and understanding of the specification. It is intended by the applicant to include all such modifications and alterations insofar as they come within the scope of the appended claims or the equivalents thereof.

What is claimed:

1. A method to identify and remove machine contributions from tire uniformity measurements made on a tire uniformity machine for measuring and collecting tire uniformity measurement signals, the method characterized by the steps of:

a) mounting a test tire on the tire uniformity machine;

b) determining a first uniformity measurement signal of the test tire by performing first measurement of uniformity of the test tire on the tire uniformity machine;

c) calculating an average machine contribution signal from the first uniformity measurement signal of the test tire;

d) mounting a production tire on the tire uniformity machine;

e) determining a production tire uniformity measurement signal by performing a measurement of uniformity of the production tire on the tire uniformity machine; and f) determining a corrected production tire uniformity signal for the production tire by subtracting the average machine contribution signal from the production tire uniformity measurement signal.

2. The method of claim 1, characterized by the additional steps after step b) of:

g) removing and remounting in a randomly determined orientation the test tire on the tire uniformity machine; and h) determining a repeated measurement of uniformity signal by repeating the step of performing a measurement of uniformity of the test tire on the tire uniformity machine; and i) including the repeated measurement of uniformity signal in step c) of calculating the average machine contribution signal by averaging the repeated measurement of uniformity signal with the first measurement of uniformity signal of the test tire.

3. The method of claim 2, characterized by:

repeating steps g) and h) multiple times, to create multiple repeated measurement of uniformity signals for the test tire, wherein the repeated steps comprise the step of removing and remounting in a randomly determined orientation the test tire on the tire uniformity machine, and the step of determining a repeated measurement of uniformity signal; and after multiple times of repeating steps g) and h), including the multiple repeated measurement of uniformity signals in the step i) by averaging together all of the repeated measurement of uniformity signals and the first measurement of uniformity of the test tire to calculate the average machine contribution signal.

4. The method of claim 3, characterized by:

quantifying a random variability of the machine contribution by analyzing the multiple repeated measurement of uniformity signals of the test tire; and using the quantified random variability of the machine contribution to determine the quantity of the multiple repeated measurement of uniformity signals for the test tire.

5. The method of claim 1, characterized by:

using the corrected production tire uniformity signal to evaluate quality of the production tire.

6. The method of claim 1, characterized by:

using the corrected production tire uniformity signal to guide corrective procedures used to improve quality and uniformity of the production tire.

7. The method of claim 1, characterized by:

processing the measurement signals in digitized forms in an arithmetic operation circuit whereby the measurement signals are digitized and stored, calculations are performed, and corrective actions are processed.

8. The method of claim 1, characterized by:

storing the calculated average machine contribution signal; and determining a corrected production tire uniformity signal for additional production tires by repeating for each additional production tire the series of steps d), e) and f) which comprise the step of mounting the production tire on the tire uniformity machine, the step of determining a production tire uniformity measurement signal by performing a measurement of uniformity of the production tire on the tire uniformity machine, and the step of subtracting the stored average machine contribution signal from the production tire uniformity measurement signal.

9. A method to identify and remove machine contributions from tire uniformity measurements made on a tire uniformity machine for measuring and collecting tire uniformity measurement signals, the method characterized by the steps of:

mounting a test tire on the tire uniformity machine;

determining a first uniformity measurement signal of the test tire by performing a first measurement of uniformity of the test tire on the tire uniformity machine;

calculating an average machine contribution signal from the first uniformity measurement signal of the test tire;

refining the average machine contribution signal by repeating a sub-series of steps a pre-determined number of times, wherein the sub-series of steps comprises the steps of:

removing and remounting in a randomly determined orientation the test tire on the tire uniformity machine;

determining a repeated measurement of uniformity signal by repeating the step of performing a measurement of uniformity of the test tire on the tire uniformity machine; and including the repeated measurement of uniformity signal in the step of calculating the average machine contribution signal by averaging the repeated measurement of uniformity signal data with the previously-determined average machine contribution signal data;

and after completing repetitions of the sub-series of steps a pre-determined number of times, mounting a production tire on the tire uniformity machine;

determining a production tire uniformity measurement signal by performing a measurement of uniformity of the production tire on the tire uniformity machine; and determining a corrected production tire uniformity signal for the production tire by subtracting the average machine contribution signal from the production tire uniformity measurement signal.

10. The method of claim 9, characterized by:

processing the measurement signals in digitized forms in an arithmetic operation circuit whereby the measurement signals are digitized and stored, calculations are performed, and corrective actions are processed.

11. The method of claim 9, characterized by:

storing the calculated average machine contribution signal; and determining a corrected production tire uniformity signal for additional production tires by repeating for each additional production tire the series of steps of mounting the production tire on the tire uniformity machine, determining a production tire uniformity measurement signal by performing a measurement of uniformity of the production tire on the tire uniformity machine, and subtracting the stored average machine contribution signal from the production tire uniformity measurement signal.

* * * * *